(No Model.)
C. C. & J. A. BISHOP.
Vehicle Spring.
No. 243,492. Patented June 28, 1881.
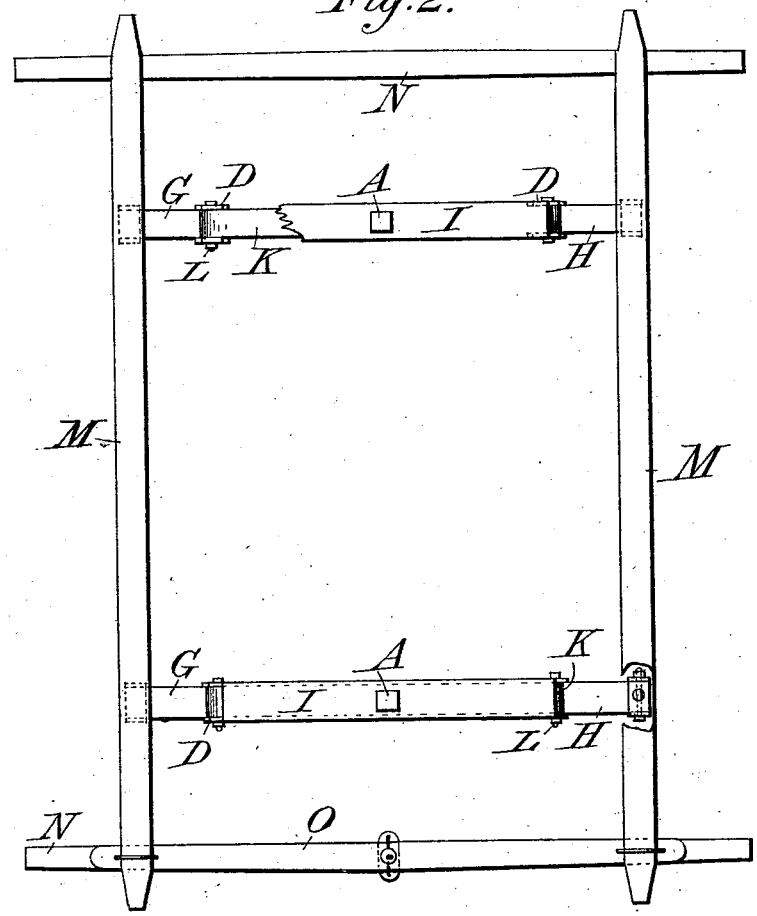

UNITED STATES PATENT OFFICE.

CHARLES C. BISHOP AND JOSEPH A. BISHOP, OF NASHVILLE, ASSIGNORS TO CASWELL C. BISHOP, OF MURFREESBOROUGH, TENNESSEE.

VEHICLE-SPRING.

SPECIFICATION forming part of Letters Patent No. 243,492, dated June 28, 1881.

Application filed September 18, 1880. (No model.)

*To all whom it may concern:*

Be it known that we, CHARLES C. BISHOP and JOSEPH A. BISHOP, citizens of the United States, residing at Nashville, in the county of Davidson and State of Tennessee, have invented certain new and useful Improvements in Springs for Side-Bar Vehicles, of which the following is a specification.

The object of our invention is to provide a light and durable transverse spring for buggies and other side-bar vehicles, so constructed and arranged as to secure a steady equalizing elasticity of its parts, and thus overcome the rocking or side motion to which such vehicles are liable. We attain this object by means of the particular construction and arrangement of three transverse springs, the lower ones of which are curved upward at their ends and attached to the upper spring and side bars by suitable clips or shackles, as illustrated in the accompanying drawings, in which—

Figure 1 is a view of our improved spring attached to the cross-bar and side bars of a vehicle, and Fig. 2 is a top-plan view of the same.

In the drawings, I is a bar attached to the bottom of a carriage-body.

A is a bolt or clip securing the upper transverse spring K to the bar I. The spring K is made of steel in one or more leaves, and is preferably bow-shaped, as shown in Fig. 1. This spring is provided on its under surface, near the center, with shackles or heads B C, to which are attached the inner upwardly-curved ends of the steel springs G H by means of the bolts *s s*, or in any other suitable manner.

The springs G H may be made of one or more leaves, as desired, and are each provided on the upper surface, near the outer end, with a shackle or head, D, to which are secured the outer ends of the spring K by means of bolts L or their equivalents. These springs are also attached by their outer upwardly-curved ends to shackles P P on the side bars, M M.

N N are the axles, and O the head-block.

It will be observed that the springs G H are arranged transversely below the spring K, and that these several springs are so connected that the ends of the spring K are at such points above the springs G H as to insure the requisite degree of elasticity. When these springs are employed they will perfectly equalize the motion of the end bars, both ends of which will rise and fall equally at every movement.

We are aware that it is not new to employ springs in connection with the side bars of a vehicle. When so arranged, however, the lower springs have heretofore been made of such a form as to occupy a space on the upper spring nearly equal to the length of each, which detracts from their elasticity. By curving the ends of the lower springs, G H, upward and arranging them as shown in Fig. 1 they are made to occupy a much less space on the upper spring in proportion to their length, and thus secure the perfect equalizing elasticity for which they are designed, while at the same time all tendency of rocking to either side is effectually prevented. Our improved springs, being curved, as shown, and hung in loose shackles, are enabled to lengthen and shorten on the side bars without strain. They are also entirely independent of the couplings, and can be readily attached to any side-bar vehicle.

Having thus described our invention, what we claim as new, and desire to secure by Letters Patent, is—

The combination, with the side bars, M M, transverse bars I, and springs K, of the transverse spring G H, having upwardly-curved ends, all the parts being connected by suitable clips and shackles, and arranged as and for the purpose set forth.

CHAS. C. BISHOP.
JOS. A. BISHOP.

Witnesses:
T. E. MATTHEWS,
JAS. S. FRAZER.